United States Patent
Thrap

(10) Patent No.: US 7,027,290 B1
(45) Date of Patent: Apr. 11, 2006

(54) CAPACITOR HEAT REDUCTION APPARATUS AND METHOD

(75) Inventor: Guy C. Thrap, Del Mar, CA (US)

(73) Assignee: Maxwell Technologies, Inc., San Diego, CA (US)

(*) Notice: Subject to any disclaimer, the term of this patent is extended or adjusted under 35 U.S.C. 154(b) by 0 days.

(21) Appl. No.: 10/934,895

(22) Filed: Sep. 3, 2004

Related U.S. Application Data

(60) Provisional application No. 60/525,483, filed on Nov. 26, 2003, provisional application No. 60/518,422, filed on Nov. 7, 2003.

(51) Int. Cl.
*H01G 9/00* (2006.01)
*H01G 2/14* (2006.01)

(52) U.S. Cl. .................. 361/502; 361/274.3; 361/274.2

(58) Field of Classification Search .............. 361/502, 361/274.1, 274.2, 274.3
See application file for complete search history.

(56) References Cited

U.S. PATENT DOCUMENTS

| | | | |
|---|---|---|---|
| 5,214,564 A * | 5/1993 | Metzler et al. | ............ 361/699 |
| 6,222,715 B1 | 4/2001 | Gruhn | |
| 6,259,595 B1 | 7/2001 | Hebel | |
| 6,262,360 B1 | 7/2001 | Michel | |
| 6,323,750 B1 | 11/2001 | Lampi | |
| 6,424,514 B1 | 7/2002 | Boy | |
| 6,708,757 B1 | 3/2004 | Hebel | |
| 6,710,996 B1 | 3/2004 | Bobert | |

FOREIGN PATENT DOCUMENTS

| | | | |
|---|---|---|---|
| JP | 2002-353078 | * | 12/2002 |
| JP | 2003-272974 | * | 9/2005 |

* cited by examiner

*Primary Examiner*—Eric W. Thomas

(57) ABSTRACT

High capacitance capacitors are provided to supply or accept large currents. As current flow through a capacitor increases, heat may be generated. Above a certain threshold temperature or current, a capacitor may fail. The present invention addresses capacitor's tendency to fail at higher currents and/or higher temperatures.

12 Claims, 9 Drawing Sheets

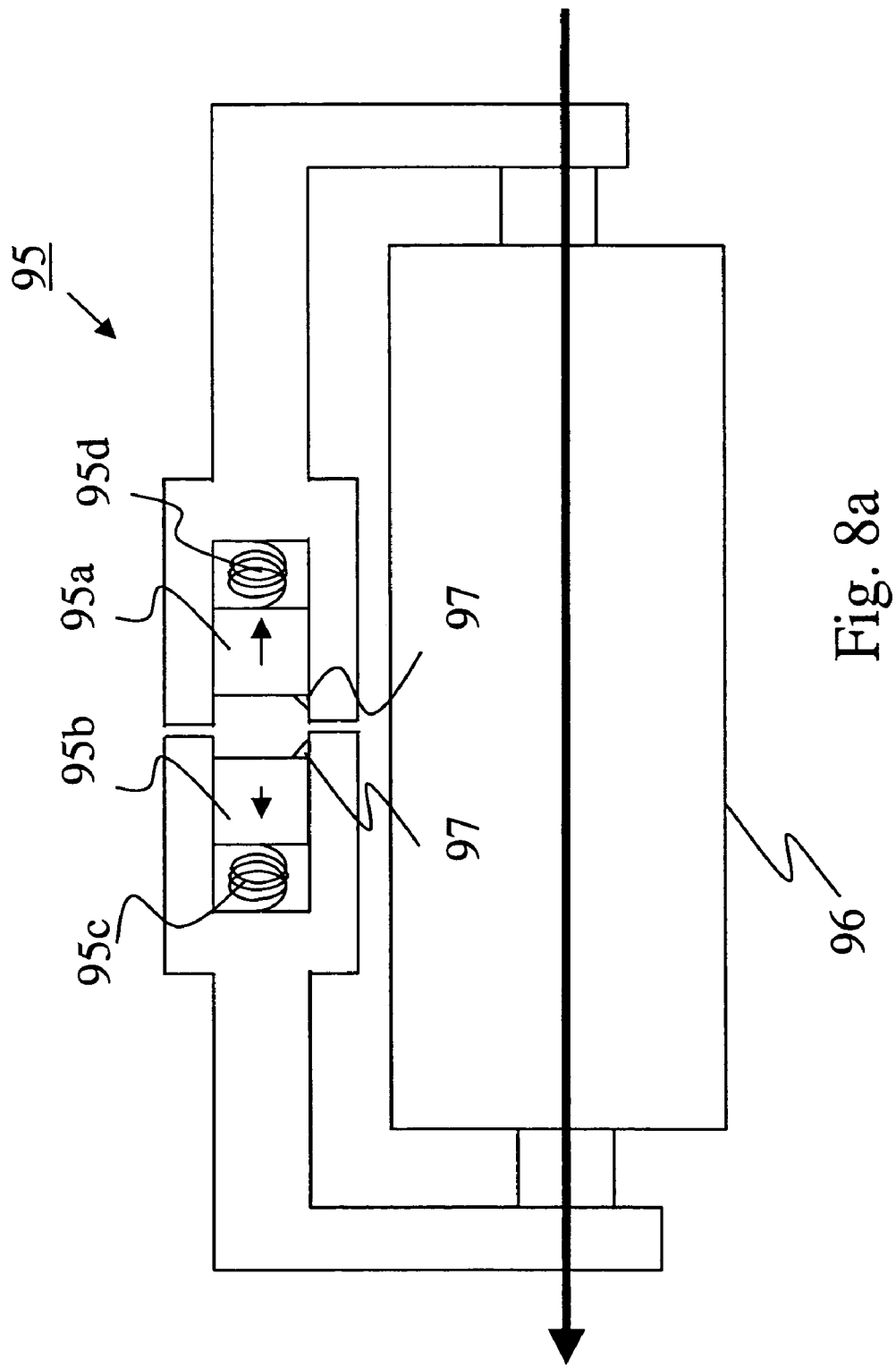

CAPACITOR HEAT REDUCTION APPARATUS AND METHOD

RELATED APPLICATIONS

Figure 1:
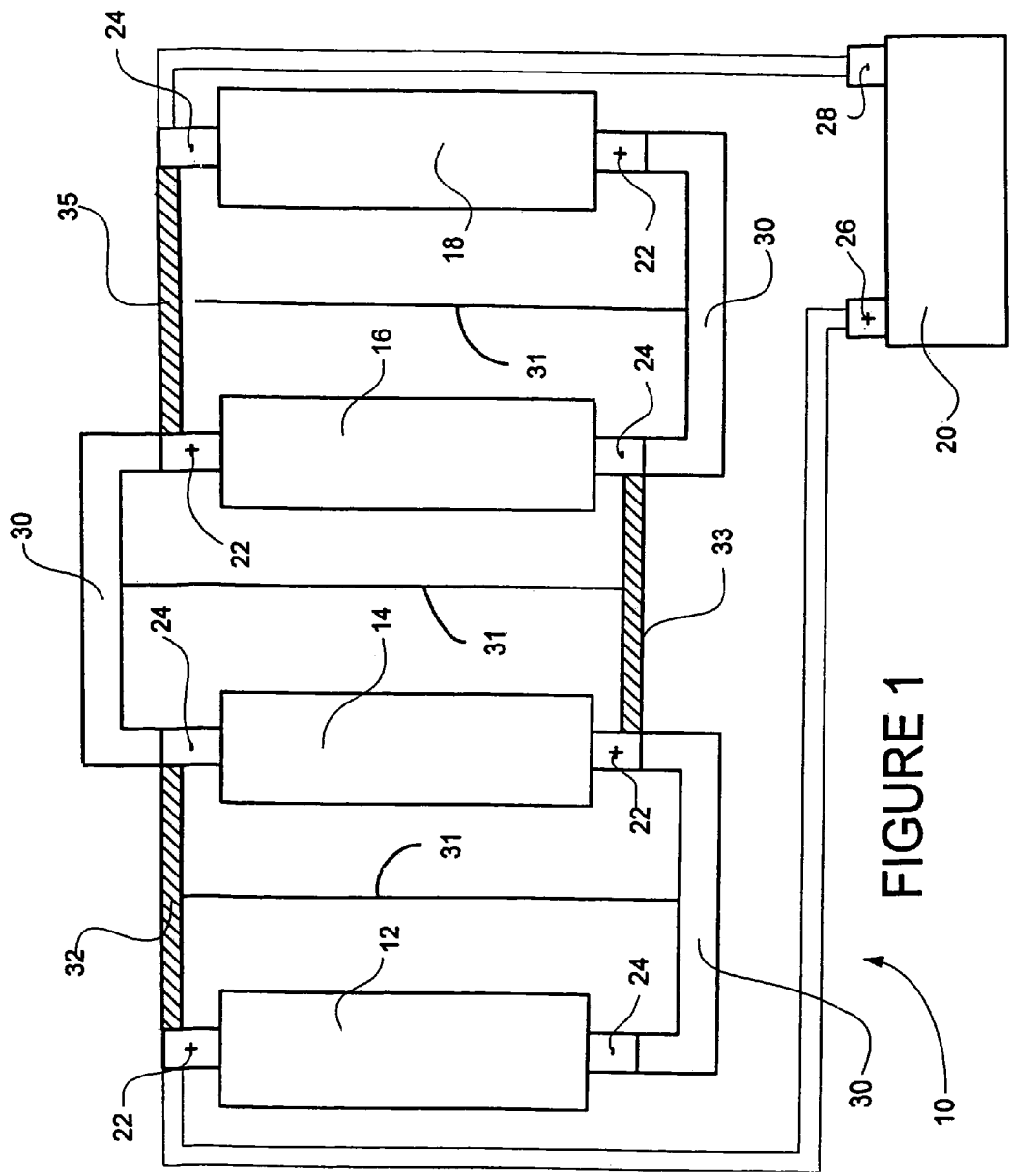

This application is related to and claims priority from U.S. Provisional Application No. 60/525,483 filed 26 Nov. 2003, which is commonly assigned and incorporated herein by reference; and This application is related to and claims priority from U.S. Provisional Application No. 60/518,422 filed 7 Nov. 2003, which is commonly assigned and incorporated herein by reference.

FIELD OF THE INVENTION

The present invention is related to protection against heat in general, and to protection against heat in high current capacitor applications more particularly.

BACKGROUND

Double-layer capacitors, which are also known as ultracapacitors and supercapacitors, are now capable of being produced as individual capacitor cells that can store hundreds and thousands of farads. Due in part to their large capacitance, double-layer capacitors are capable of supplying or accepting large currents. However, single double-layer capacitor cells are limited by physics and chemistry to a maximum operating voltage of about 4 volts, and nominally to about between 2.5 to 3 volts. As higher capacitance capacitors are configured for use in increasingly higher voltage applications, even higher currents may be generated during charge and discharge of the capacitors. Use of double layer capacitors in high current applications will need to address increases in heat.

SUMMARY

High capacitance capacitors can store large amounts of energy and are capable of supplying or accepting large currents. As current flow through a capacitor increases, heat may be generated. Above a certain threshold temperature or current, a capacitor may fail. The present invention addresses capacitor's tendency to fail at higher currents and/or higher temperatures.

In one embodiment, a system comprises: at least one interconnection, the at least one interconnection comprising at least one increased surface area portion; and at least one capacitor, the at least one capacitor coupled to the at least one interconnection, wherein the at least one interconnection lowers a temperature of the at least one capacitor. A first of the at least one interconnection may be coupled to a negative terminal of a first capacitor and a positive terminal of a second capacitor. A second of the at least one interconnection may be coupled to a positive terminal of the second capacitor, a negative terminal of the second capacitor, and the first interconnection. When connected in series, a plurality of the interconnected capacitors are charged to about 42 volts. At least six of the capacitors may be interconnected in series, wherein the at least six capacitors comprise double-layer capacitors. The second of the at least one interconnection may comprise a capacitor balancing circuit. At least one interconnection may comprise one or more ribbed portion. The system may comprise a source of external heat removal. The source of external heat removal may comprise a fluid, wherein the at least one capacitor is immersed in the fluid. The fluid may be disposed in a sealed container. The fluid may comprise an oil. The fluid may comprise an alcohol. The fluid may comprise a colored fluid. A current of at least 1000 amps may be passed through the at least one capacitor. The system may comprise a vehicular system, the system further comprising an electrical device, wherein the at least one capacitor is coupled to the electrical device.

In one embodiment, a method of using a plurality of capacitors may comprise: providing a plurality of double-layer capacitors; connecting the plurality of double-layer capacitors with an increased surface area interconnection; passing a current through the plurality of double-layer capacitors; and decreasing a temperature of the plurality of double-layer capacitors using the increased surface area interconnection. The increased surface area interconnection may comprise a series connection between the plurality of capacitors. The increased surface area interconnection may comprise a balancing circuit. The method may further comprise a step of passing a source of external heat removal over the plurality of double layer capacitors. The external heat removal may comprise a fluid. The fluid may comprise an oil. The fluid may comprise a colored fluid. The fluid may comprise a fragrance. The plurality of double-layer capacitors may be coupled to a propulsion engine.

In one embodiment, a capacitor based system may comprise a plurality of interconnected double-layer capacitors; and capacitor heat reduction means for reducing a temperature of the one or more interconnected capacitors.

Other embodiments, benefits, and advantages will become apparent upon a further reading of the following Figures, Description, and claims.

FIGURES

In FIG. 1 there are seen capacitors connected in series.

Figure 2:
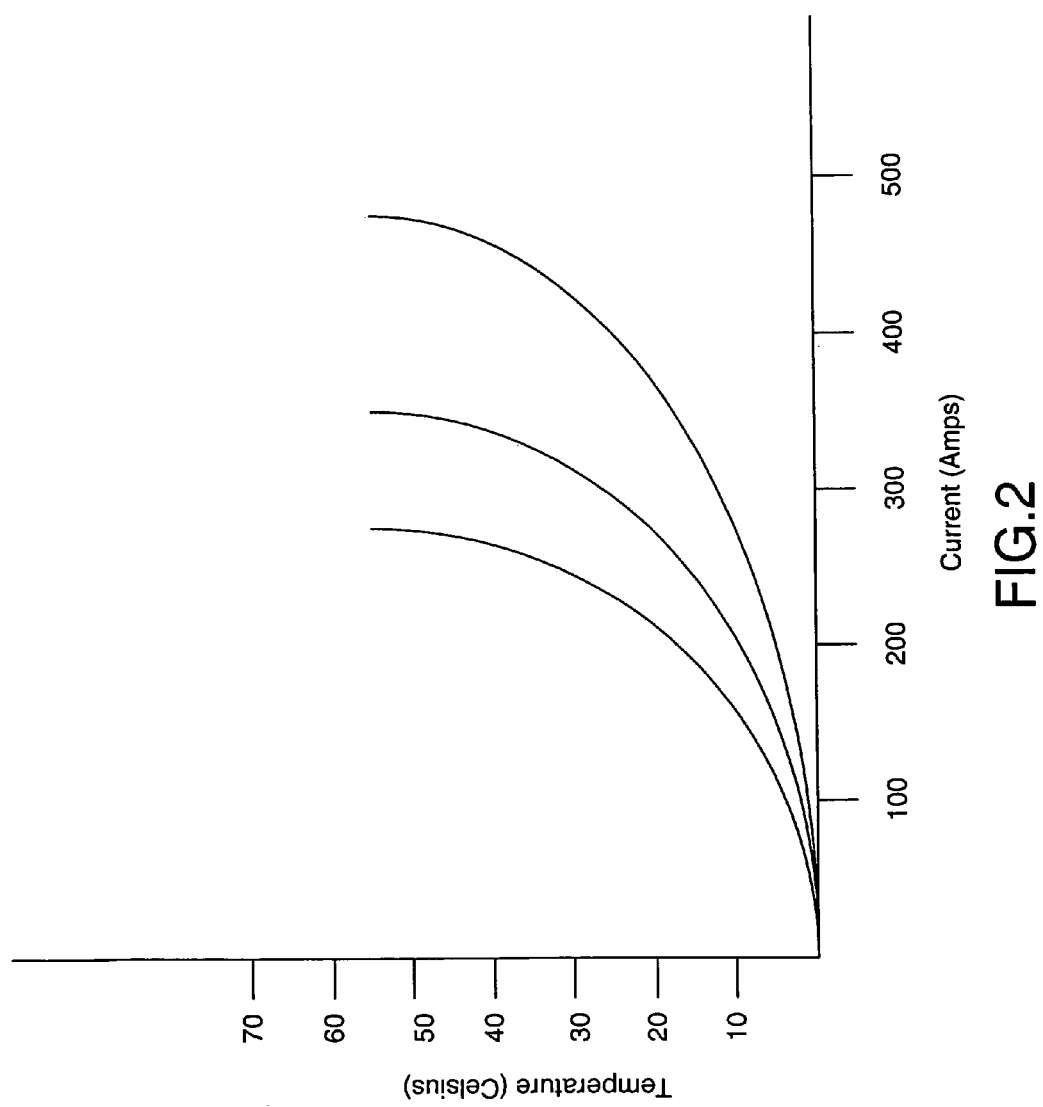

In FIG. 2 there are illustrated capacitor current vs. capacitor temperature graphs.

Figure 3:
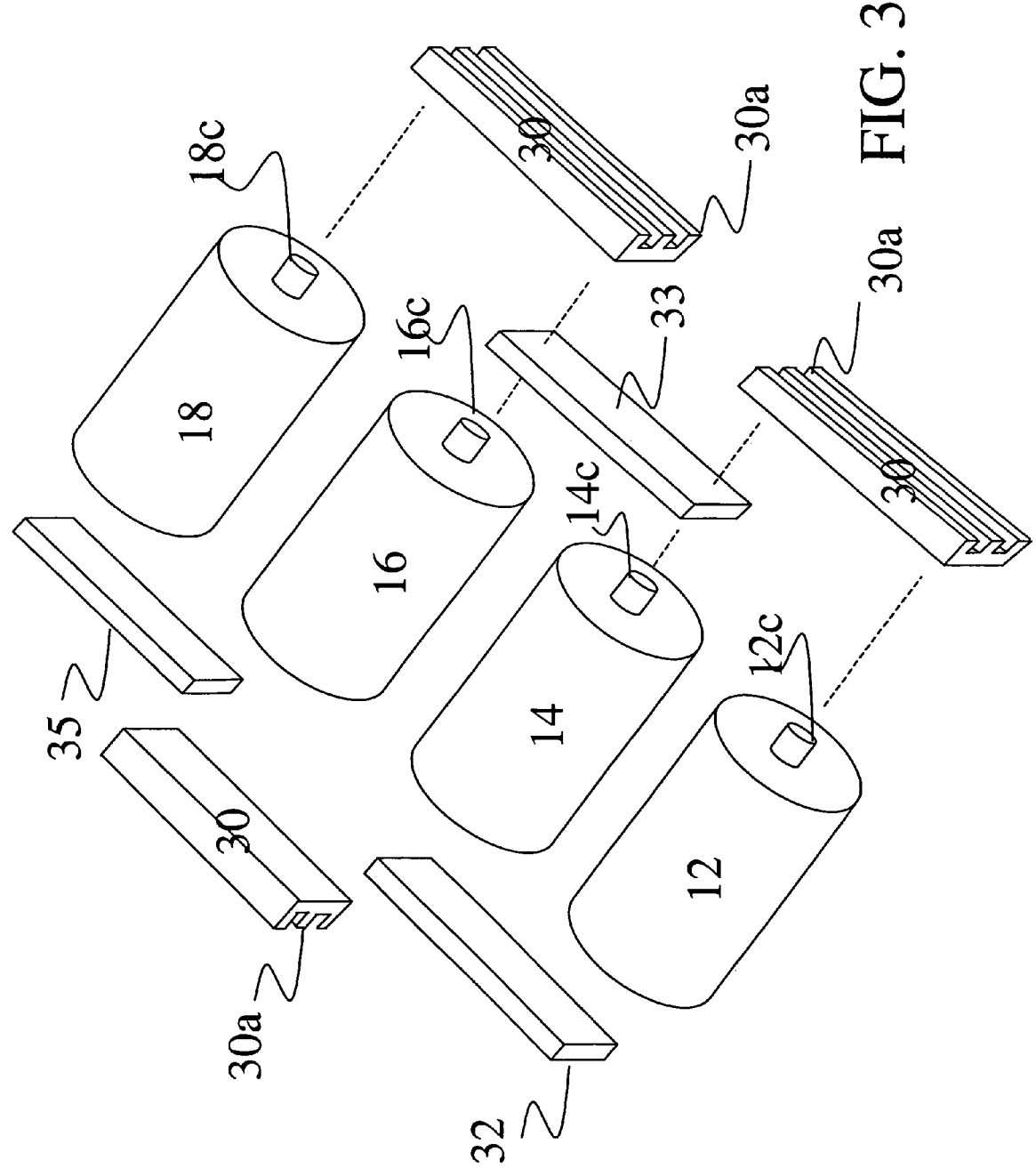

In FIG. 3 there are seen interconnections provided with increased surface area.

Figure 4:
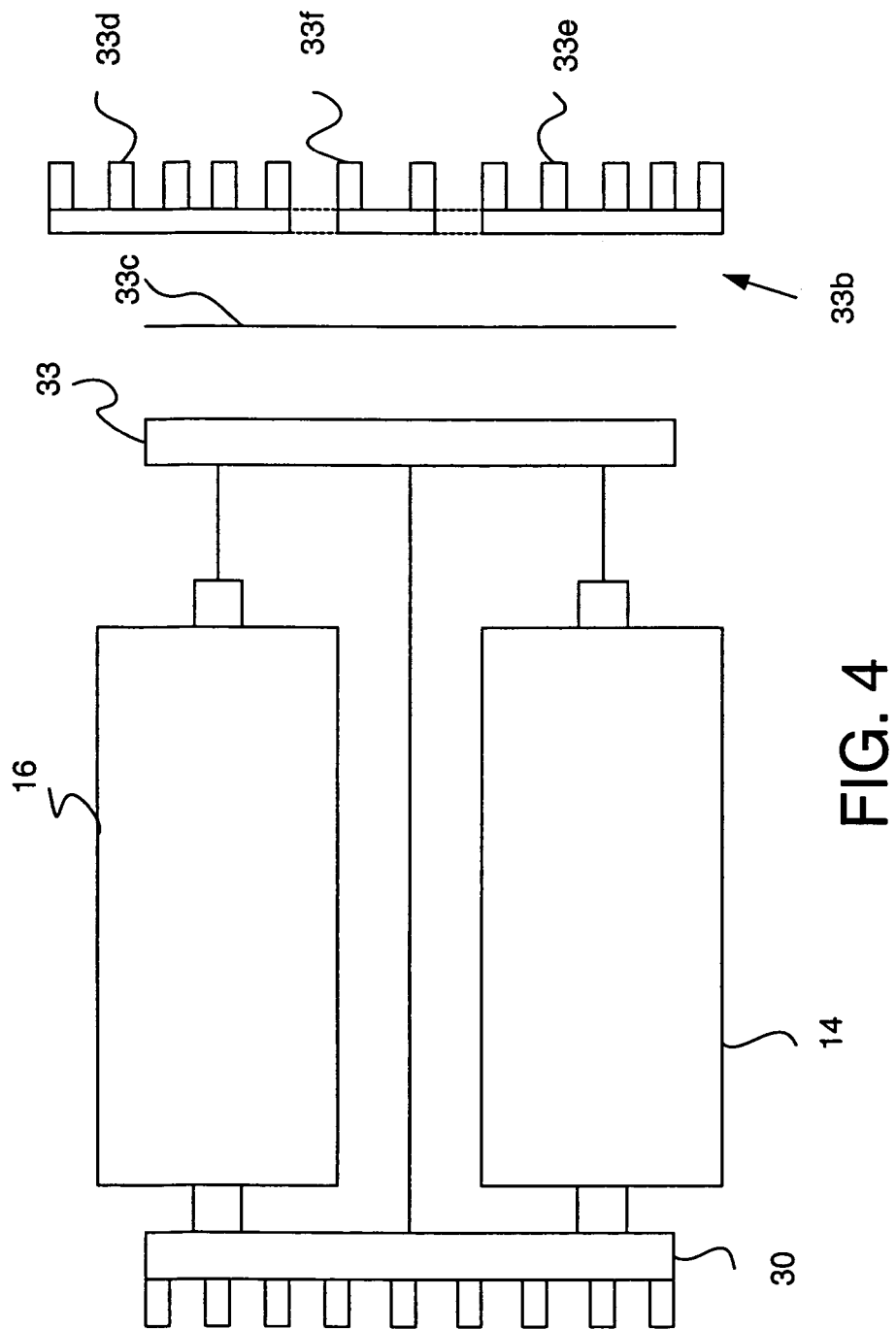

In FIG. 4 there is seen a cell balancing circuit 33 used with a circuit substrate.

Figure 5:
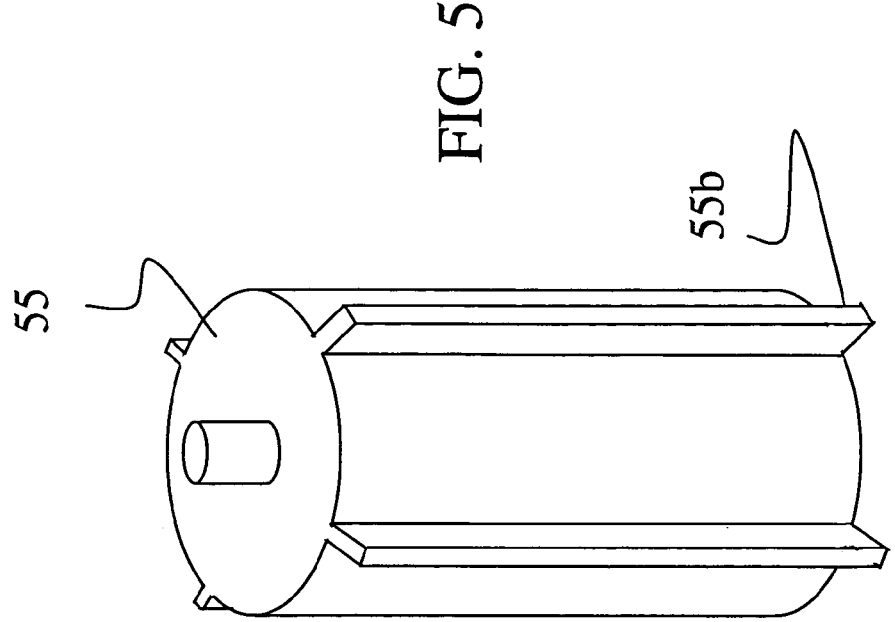

In FIG. 5 there is seen a capacitor housing configured to provide an increased surface area.

Figure 6:
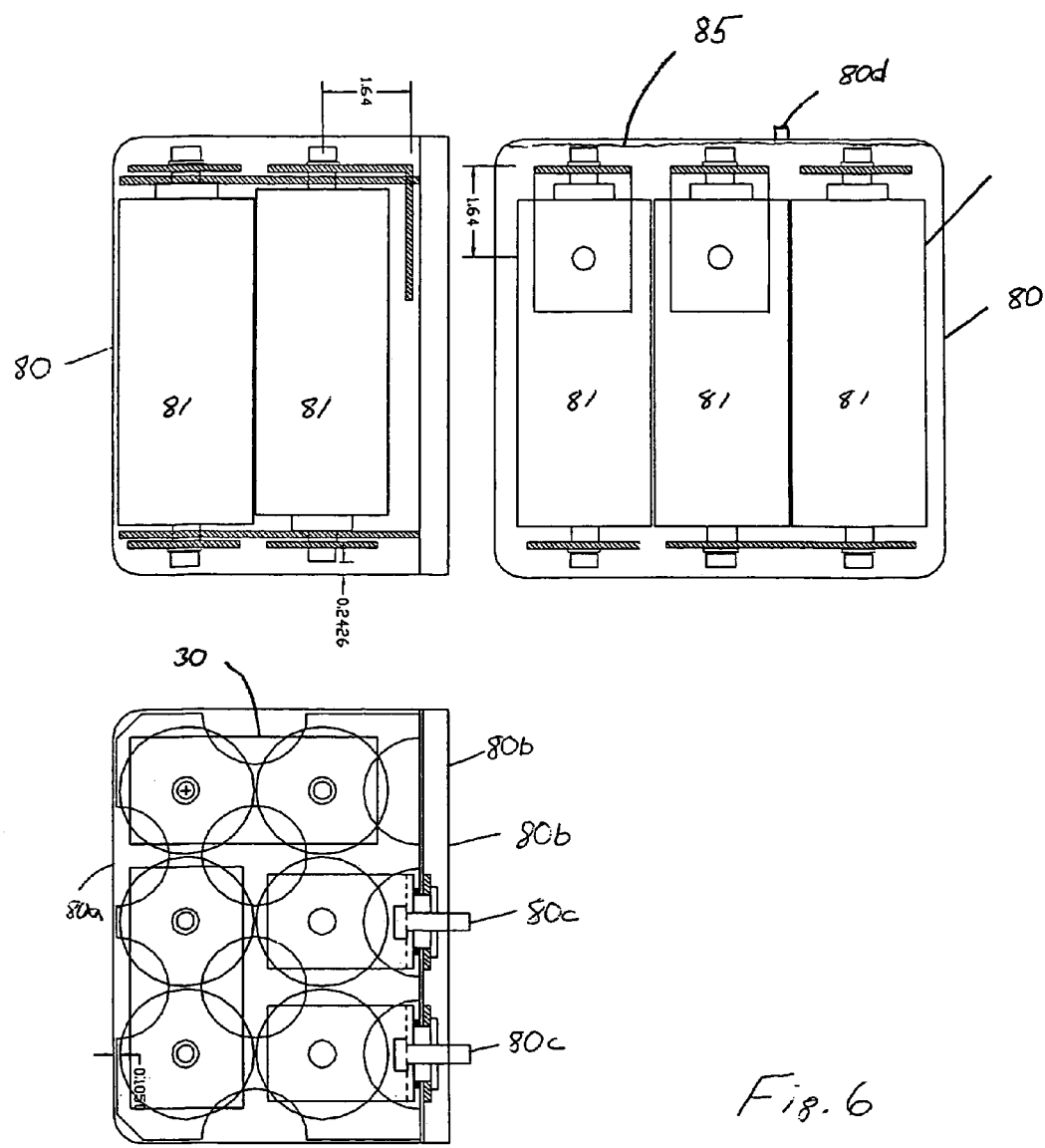

In FIG. 6 there is seen three transparent side views of six series interconnected capacitors disposed within a container.

Figure 7B:
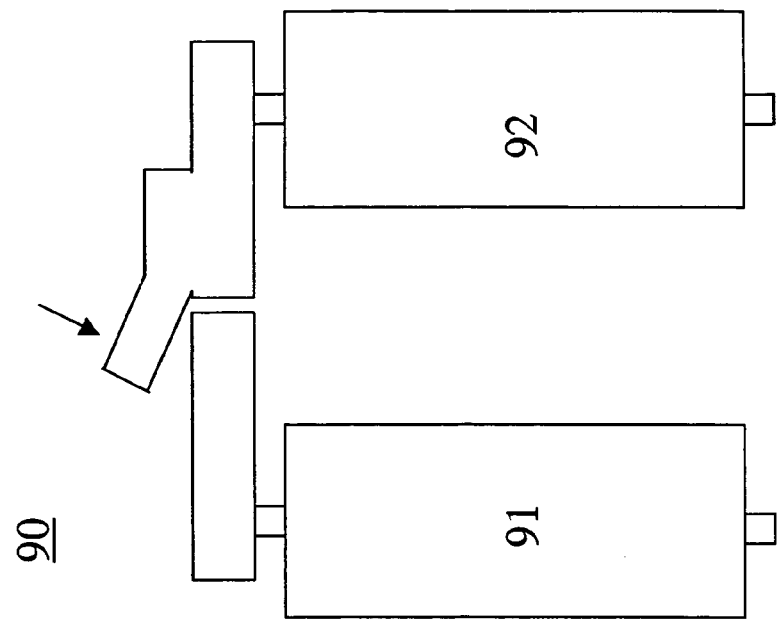
Figure 7A:
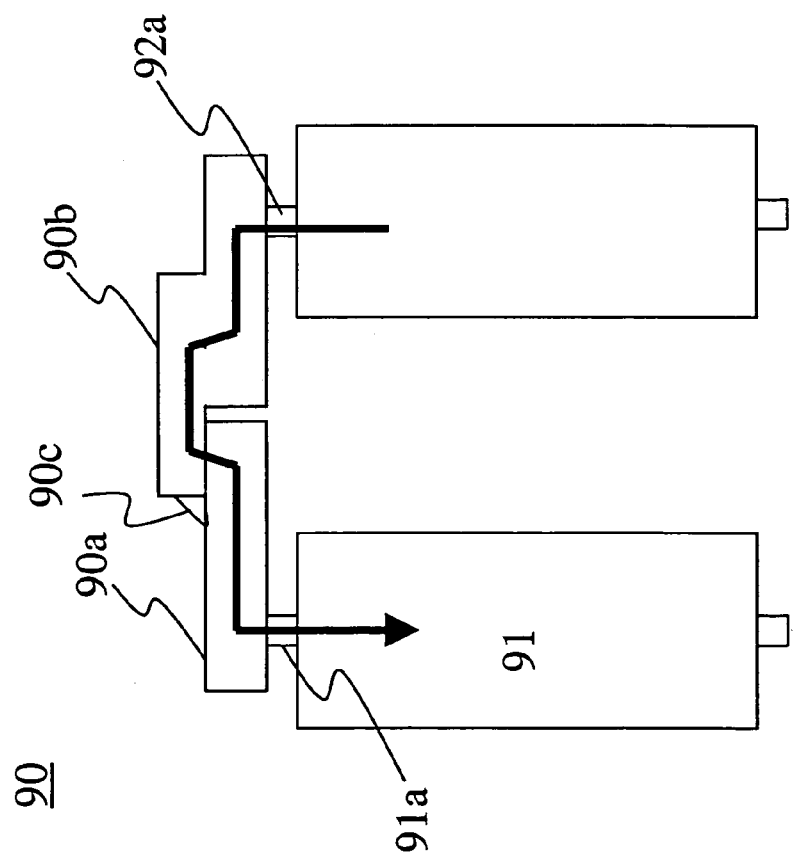

In FIGS. 7*a–b* there is seen a thermal fuse used as an interconnection between two capacitors.

Figure 8B:
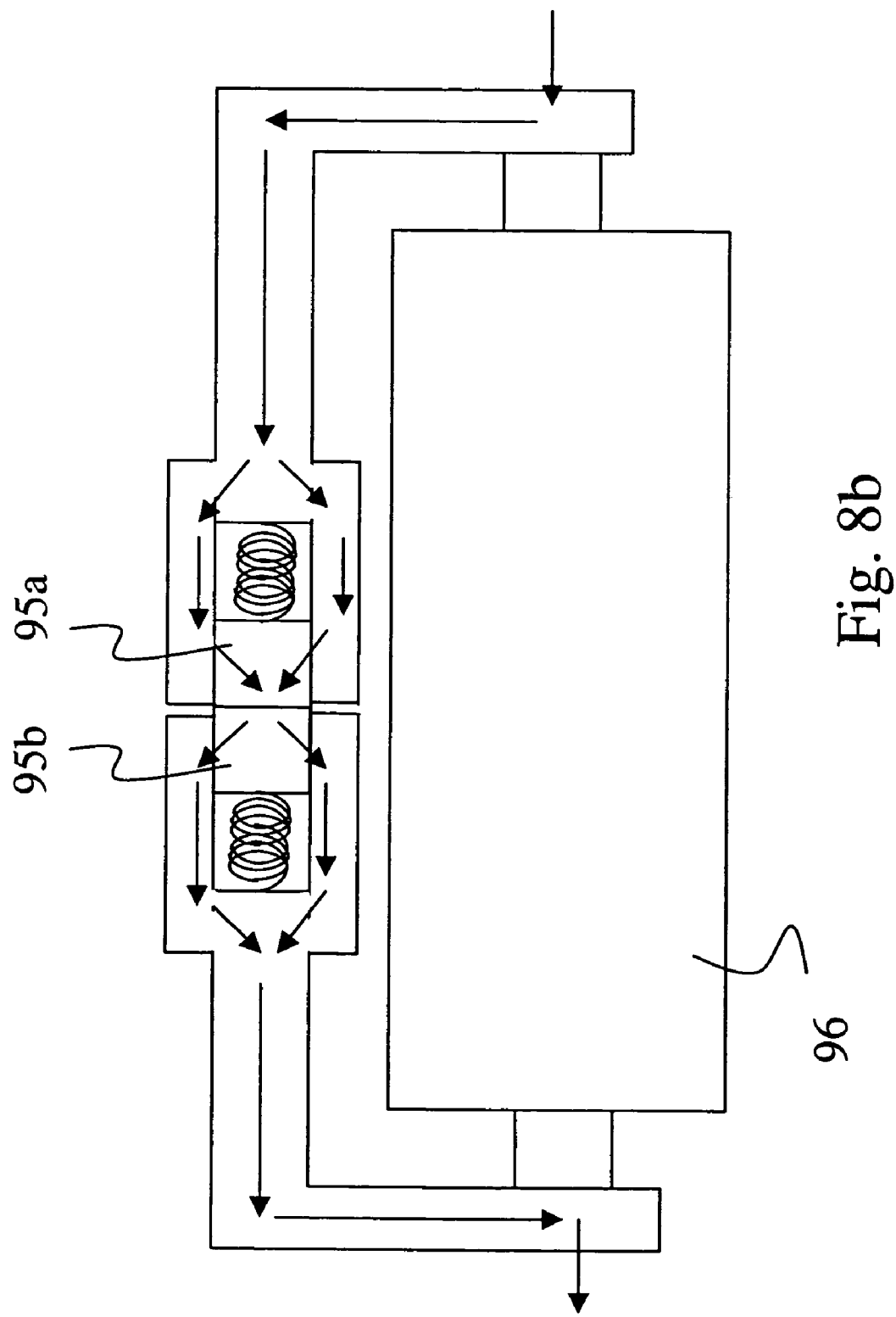

In FIGS. 8*a–b* there is seen use of a thermal contactor to bypass current flow around a capacitor.

DESCRIPTION

High capacitance capacitors can store large amounts of energy and are capable of supplying or accepting large currents. As current flow through a capacitor increases, heat may be generated. Above a certain threshold temperature or current, a capacitor may fail. The present invention addresses the tendency of capacitors to fail at higher currents and/or higher temperatures.

Referring now to FIG. 1, there are seen capacitors connected in series. In one embodiment, four 2600 F|2.5 V|60 mm×172 mm|525 g| sealed capacitors 12, 14, 16, 18 are interconnected as a series string of capacitors. A type of capacitor capable of such high capacitance is known to those skilled in the art as a double-layer capacitor, or alternatively, as a supercapacitor or an ultracapacitor. In FIG. 1, the series string is formed using electrically conductive interconnections 30. Interconnections 30 connect a negative terminal of a first capacitor 12 to a positive terminal of a second capacitor 14, a negative terminal of the second capacitor to a positive terminal of a third capacitor 16, and a negative terminal of the third capacitor 16 to a positive terminal 22 of a fourth capacitor 18. When a charging source 20 is connected across the positive terminal of capacitor 12 and the negative terminal of capacitor 18, a current flows through the capacitors and the interconnections therebetween. In one embodiment, it has been identified that when charged to 10 volts, over 2000 amps of instantaneous peak current may flow through the capacitors 12, 14, 16, 18, and interconnections 30, with such peak current dependent on the particular application. Accordingly, in one embodiment each capacitor 12, 14, 16, 18 comprises terminals 12a, 14a, 16a, 18a, and interconnections 30 that are sized to safely carry 2000 amps of peak current.

In FIG. 1 there is also seen that across respective positive and negative terminals of the capacitor 12 and 14, and across respective positive and negative terminals of the capacitor 14 and 16, and across respective positive and negative terminals of the capacitor 16 and 18, a respective cell balancing circuit 32, 33, 35 is connected. A detailed description of connection, operation, and use of cell balancing circuits is discussed in commonly assigned patent application Ser. No. 10/423,708, filed 25 Apr. 2003, which is incorporated herein by reference. Because the current used by the cell balancing circuits 32, 33, 35 is relatively small, the circuits and substrates that they may be mounted onto need not be as robust as the interconnections 30, but as will be discussed in other embodiments later herein, a more robust substrate may nevertheless be desired. Ends of cell balancing circuits 32, 33, 35 are connected to respective terminals of capacitors 12, 14, 16, 18. Each cell balancing circuit 32, 33, 35 is also coupled by a connection to a respective series interconnection 30, as is illustrated in FIG. 1.

Although capacitors comprising terminals disposed at opposing ends are illustrated in FIG. 1, it is understood that capacitors 12, 14, 16, 18 could comprise other geometries, for example, with terminals that extend from the same end of a capacitor. It is therefore understood that alternative embodiments may utilize interconnections 30 and balancing circuits 32, 33, 35 that are coupled in a different orientation to that shown by FIG. 1, and that such orientation and implementation is within the scope of the present invention. Furthermore, although only four series connected capacitors are illustrated in FIG. 1, the scope of the embodiments and inventions described herein envisions the interconnection of less or more than four series connected capacitors.

Referring back to FIG. 2, and other Figures as needed, there is illustrated a capacitor current vs. capacitor temperature graph, wherein a series interconnection 30 between the terminals of two 2600 F|2.5 V|60 mm×172 mm cylinder|525 g|capacitors is formed by of one 0.5" W×0.125" T×4.5" L conductive bus bar interconnection. The uppermost curve illustrates that as capacitor current flow increases from 0 to about 275 amps, about a 55 degree increase in capacitor temperature is observed.

Referring now to FIG. 3, and other Figures as needed, there are seen interconnections provided with increased surface area. Those skilled in the art will identify that as current through the capacitors 12, 14, 16, 18 increases, the temperature of the capacitors and interconnections 30 through which the current flows may increase. It has been identified that a reduction in the capacitor temperature may be achieved through the coupling of a sufficiently sized thermally conductive heat dissipater material against the capacitor to sink and dissipate heat away from the capacitor.

In one embodiment, it has been identified that interconnections 30 themselves can act as a heat dissipater. In one embodiment, each interconnection 30 is configured to comprise one or more increased surface area portion 30a. In the context of the present invention, what is meant by increased surface area (as opposed to minimized) is any surface geometry with which improved heat dissipation may be achieved. For example, if a flat surface were considered as a being minimized in surface area, any protrusion or depression would act to increase the surface area. Hence, in one embodiment, a flat rectangular bus bar type interconnection may be replaced with one that is dimensioned to include one or more ribbed portion 30a that provides an increased surface area with which additional heat may be drawn and dissipated away from the capacitors 12, 14, 16, 18. It is understood that although described and shown as ribs, an increased surface area could be provided by other geometries, for example, wings, posts, curved areas, surface roughening, and others known and used by those skilled in the art.

Referring back to FIG. 2, and other Figures as needed, there is illustrated by a middle curve that, for a given temperature, two series interconnected 2600 F|2.5 V|60 mm×172 mm cylinder|525 g|capacitors can be operated at a higher current when connected in series by a bus bar interconnection that comprises an increased surface area geometry. The middle curve illustrates that as capacitor current flow increases from 0 to about 350 amps, about a 55 degree increase in capacitor temperature is observed. Series interconnections 30 between capacitors 12, 14, 16, 18 may be thus configured with increased surface areas such that for a given temperature the current that series interconnected capacitors may be safely operated at may be increased. Similarly, series interconnections 30 with increased surface areas facilitate that for a given current, the operating temperature of a series interconnected capacitor may be reduced.

Referring again to FIG. 2, and other Figures as needed, there is illustrated by a bottommost curve, that at any given temperature, as compared to the topmost curve and the middle curve, two series connected 2600 F|2.5 V|60 mm×172 mm cylinder|525 g|capacitors can be operated at a higher current when used with an external source of heat removal. The bottommost curve illustrates that as capacitor current flow increases from 0 to about 475 amps, about a 55 degree increase in capacitor temperature is observed.

In one embodiment, an external source of heat removal comprises an airflow passing over and between the capacitors 12, 14, 16, 18, and the series interconnections 30. The external source of heat removal can be used to further reduce the temperature of the capacitors 12, 14, 16, 18. By providing an external source of heat removal, series connected capacitors 12, 14, 16, 18 may be used at higher currents and/or lower temperature in a wider range of applications and with greater reliability, than without external heat removal. It is identified that when an external source of heat removal is used with an interconnection 30 that comprises an increased surface area, further heat reduction may be achieved. Although identified as an airflow, other external sources of heat removal may also be used and are within the scope of the present invention. For example, external sources of heat removal may be provided by immersion in, or exposure to, liquid, fluid, gas, or other medium capable of safely acting to remove or dissipate heat away from the interconnections 30 and/or capacitors 12, 14, 16, 18.

Referring now to FIG. 4, and other Figures as needed, there is seen a cell balancing circuit 33 used with a circuit substrate. In one embodiment, it is identified that each cell balancing circuit, for example circuit 33, may be adapted to effectuate a further reduction in the temperature of series interconnected capacitors, for example, capacitors 14, 16. In one embodiment, circuit 33 comprises one or more circuit substrate portion 33b. In one embodiment, circuit substrate 33b may comprise a thermally conductive material. In one embodiment, circuit substrate 33b may comprise a thermally and electrically conductive material. In one embodiment, wherein the circuit substrate 33b is electrically conductive, cell-balancing circuit 33 may be insulatively coupled to substrate 33b, for example, by an insulative portion 33c disposed therebetween.

In one embodiment a heat dissipation circuit substrate 33b may comprise two or more electrically separated portions 33d, 33e, and/or 33f. In one embodiment, cell balancing circuit 33 may be thermally coupled to electrically separated portions 33d and 33e and to terminals of capacitors 14 and 16, as follows: one portion of circuit 33 is coupled to portion 33d, and a second portion of circuit 33 is coupled to portion 33e. In this manner, an appropriately selected substrate 33b material, for example aluminum, can be used to draw heat away from the capacitors 14 and 16 through the capacitor terminals of capacitors 33. In one embodiment, heat dissipation circuit substrate 33b may comprise one or more increased surface area portion, for example, one or more rib, or the like.

Those skilled in the art will identify that thermal and/or electrical connection of the heat dissipation substrate 33b to the cell balancing circuit 33, as well as to terminals of capacitors 14 and 16, would need to be made in a manner so as to not interfere with the electrical operation of the capacitors and the circuit. For example, for each cell balancing circuit 33, physical contact to, and electrical insulation from, each heat dissipation substrate may be effectuated by use of an insulated portion between circuit and the heat dissipation substrate. It is understood that other thermal and electrical connections and adaptations could be made without undue experimentation, and would be within the scope of one skilled in the art.

Referring now to FIG. 5, and other Figures as needed, there is seen a capacitor housing configured to provide an increased surface area. It is identified that a capacitor 55 housing may also be adapted to effectuate reduction of the temperature of the capacitor. For example, in one embodiment, a capacitor 55 may comprise one or more integrally formed increased surface area portion, for example, one or more rib 55b, or the like. When used in combination with other embodiments described herein, the increased surface area portions illustrated by FIG. 5 would allow for even more dissipation of heat away from the capacitor 55.

Referring now to FIG. 6, and other Figures as needed, there are seen three transparent side views of six series interconnected capacitors disposed within a container. In one embodiment, six series connected capacitors 81 may be disposed within a container 80. Although six series interconnected capacitors are illustrated in FIG. 6, it is understood that the principles described herein could be extended to fewer or more capacitors. For example, wherein 42 volts was a desired working voltage, those skilled in the art would identify that a larger number of double-layer capacitors may need to be connected in series, for example, 16 series interconnected 2.5 volt rated capacitors could be used to provide about 42 volts. It is identified, however, that dimensional requirements of the container 80 may limit the configuration and potential use of one or more of the heat reduction principles and embodiments described herein. Accordingly, it is understood that one or more of the features described by previous embodiments described herein may or may not be able to be fully or even partially adapted for use within a container 80. For example, in one embodiment, wherein there are six 2600 F|2.5 V|60 mm×172 mm cylinder|525 g|capacitors interconnected by bus bars 30 and cell balancing circuits, to effectuate fitment in desired container dimensions, one or more of the bus bars 30, cell balancing circuit substrates, and capacitor 81 housings may be configured with minimized or even no increased surface area portions.

In one embodiment, container 80 comprises a bottom portion 80a and a top portion 80b. In one embodiment, container 80 comprises a metal, or other material capable of resisting pressure. In one embodiment, container 80 comprises aluminum. In a manufacturing step, after one or more interconnected capacitor 81 housing is disposed within the container 80, a top portion 80b and a bottom portion 80a of the container 80 may be sealed using sealing techniques such as edge crimping, welding technique, soldering, or others known to those skilled in the art. Prior to sealing within the container 80, the one or more capacitor 81 may be fixedly mounted within the container and coupled to one or more electrically conductive terminal connections 80c. In one embodiment, the container 80 comprises a sealable vent/fill portion 80d. Various vent/fill configurations are possible and are within the expertise of those skilled in the art. If filled with a medium after sealing of the container, it is identified that the vent/fill portion 80d may be used as the point of insertion of the medium.

In one embodiment, a container 80 with one or more interconnected capacitors 81 disposed within may be filled with a high thermal conductivity heat removal medium 85. In one embodiment, the heat removal medium 85 comprises a fluid. Preferably, the heat removal medium 85 acts to direct or dissipate the heat away from the capacitors 81 and interconnections 30 to the walls of the container 81, from which the heat may be subsequently dissipated to an external environment.

Although many fluids are capable of acting as a heat dissipater or heat removal medium 85, it is identified that only some fluids may be appropriate for use with capacitors and embodiments described herein. It is identified that heat removal medium 85 desirably exhibits high dielectric properties that do not present low resistance conduction paths between the electrical connections and circuits used within container 80, for example, between terminals of the capacitors 81 and/or terminals 80c. It is also identified that heat removal medium 85 desirably exhibits high flash point properties such that at high temperatures the medium does not ignite. It is further identified that a release of electrolyte from within a capacitor housing 81, as could occur when a capacitor that is subjected to excessive heat or current, could cause an undesired interaction with a heat removal medium in a container 80. Accordingly, it is identified that in one embodiment, a heat removal medium 85 desirably effectuates harmless mixing with an electrolyte that may become present within the container 80. In one embodiment, when an Acetonitrile ($C_2H_3N$) type of electrolyte is used within a capacitor 81 housing, it is identified that release of the electrolyte into a container 80 could cause undesired chemical interaction with an inappropriate heat removal medium 85. For example, because of low miscibility and high conductivity, water would be unsuitable as a heat removal medium, which either by itself or in the presence of Acetonitrile electrolyte could electrolyze to create a hydrogen byproduct within container 80 that could subsequently explode. It is also identified that a heat removal medium 85 preferably minimizes the potential for chemical and/or electrical interactions within a container 80, but as well, with an environment external to the container. In one embodiment, a heat removal medium 85 that exhibits a plurality of the desired properties identified above comprises a commonly available type of cooking coil known as Wesson® Canola Oil available from ConAgra Foods Inc., One ConAgra Drive, Omaha, Nebr. 68102.

A product comprising one or more sealed capacitor 81 housing disposed within a sealed container 80 may be provided for use in many different applications. For example, a sealed container 80 comprising one or more interconnected capacitor 81 disposed therein may be used as a primary or secondary vehicular energy source. In one embodiment, conventional batteries in a hybrid vehicle may be replaced by, or supplemented with, one or more sealed container 80. Because container 80 and the capacitors 81 housed therein are sealed, the container 80 may be mounted in many more physical orientations than that previously possible with lead acid batteries. It has been identified that depending on the physical orientation of a sealed container 80, the heat removal medium 85 may change its orientation relative to the capacitors 81 housed therein. Because it is desired that a heat removal medium 85 preferably does not occupy the entire free volume within the sealed container 80 (to provide for expansion of the medium at higher temperatures), when the orientation of the container is changed, the orientation of a heat removal medium may also change such that one or more of capacitors within the container may become exposed to a free volume of air. Exposure to a free volume, rather than a heat removal medium that can dissipate heat away from a capacitor 81, may subject one or more of the capacitors to increased or excessive heat build up. Accordingly, in one embodiment, depending on the dimensional geometry of the container 80, and the geometry of the capacitors 81 disposed within, an appropriate amount of heat removal medium 85 is disposed within the container so as to take into account a range of potential usage orientations of the container 80. Calculation of the amount of heat removal medium so that a remaining volume or air within the container 80 would allow for expansion of the heat removal medium and, as well allow full or substantially full immersion of a particular geometry of interconnected capacitors within the heat removal medium over a particular usage orientation and temperature range, would vary according to dimensional requirements.

In one embodiment, it is identified that a container 80 and interconnected capacitors 81 within can be configured such that when positioned or attached on a side, capacitors 81 disposed within the container remain immersed within the heat removal medium. For example, in one embodiment, with a six sided box type container 80 and a proper amount of heat removal medium 85, it is identified that the capacitors 81 within the container may remain completely immersed in the heat removal medium when the container is positioned on any one of the six sides.

It is identified that despite implementation of one or more embodiments described herein, under some conditions, one or more capacitor 81 disposed within a container 80 may nevertheless overheat and/or fail such that the contents of the capacitor(s) may leak from within a sealed capacitor 81 housing into the heat removal medium 85. It is desired therefore that the heat removal medium 85 within container 80 comprises a high flash point and low chemical and/or electrical interactivity with the particular contents of a capacitor 81 such interactions between the heat removal medium and the contents of the capacitors would preferably create only a benign pressure buildup within the container. One such heat removal medium may comprise the aforementioned cooking oil.

In one embodiment, with an appropriately sized and dimensionally sealed container, a housing 80 may be configured to contain such the pressure build up. Alternatively, in one embodiment, a sealed vent/fill portion 80d may be provided to controllably release the pressure build up and, thus, some of the heat removal medium 85 within. Designs and configurations of vent/fill portions to controllably release pressure at a given pressure are numerous and could be implemented by those skilled in the art without undue experimentation.

It is identified that if the heat removal medium 85 is minimally interactive with an external environment, a release through a vent/fill portion may not be completely undesired. It is identified that release (via a pressure build up within container 80) of heat removal medium 85 from within a container 80 may be used as an indication that overheating or failure of a capacitor 81 has occurred or may occur. It is also identified that it may be desired to more easily distinguish an expelled heat removal medium 85 from other medium present outside or near a container 80, for example, in a vehicular application where there may also be present expelled motor oil, transmission, radiator, and/or brake fluids. In one embodiment, it has been identified that by mixing the heat removal medium 85 with an inert or semi-inert material comprising a distinctive color or fragrance, the presence of the medium, and, thus, potential or actual failure of a capacitor within a container may be easily identified. For, example, in one embodiment, a coloring agent may be added to the heat removal medium 85 such that it differs from standardized colors of other fluids present in a vehicle. In one embodiment, the coloring agent may comprise a color not used in the manufacture of motor oil, transmission, radiator, and/or brake fluids, for example, a blue coloring agent. Those skilled in the art will identify that other colors used to indicate leakage of heat removal medium 85 are also possible and within the scope of the present invention.

In one embodiment, it is identified that a heat removal medium 85 may comprise an alcohol. In one embodiment, the alcohol comprises a methanol alcohol that may be mixed with a coloring agent. Methanol may find utility when the container 80 is utilized in a low temperature environment. However, it is identified that methanol may interact with electrolyte and cause chemical interactions that could increase pressure within a container 80. Although interactions between heat removal medium 85 and an electrolyte has been indicated as not being a preferred condition, it is identified that the chemical properties of and interaction with methanol may be of a nature (i.e. non-explosive, etc.) enough that its pressurized expulsion from container 80 would not necessarily be undesired.

A failure mode of a capacitor may be preceded by a temperature increase at or near the capacitor. Such a temperature may be deemed to be below, above, or at the temperature that a capacitor may start to leak electrolyte, and/or that a sealed container may begin to expel heat removal medium. It is identified that devices other than capacitors may also generate heat, which may act increase the temperature of a capacitors operating environment. In one embodiment, it is identified that a nominal operating temperature of a capacitor and/or container is about −40 to 85 degrees Celsius, and a failure mode temperature is about 120 degrees Celsius. Accordingly, it may be desired to take preventive action at some temperature, for example, before a failure mode temperature is reached or indicated.

Referring now to FIGS. 7a–b, and other Figures as needed, there is seen a thermal fuse. In one embodiment, it is identified that a conductive thermal fuse 90 may be used as an interconnection between two interconnected capacitors, for example, capacitors 91, 92. In one embodiment, a conductive thermal fuse 90 is configured to act at a certain predetermined environmental temperature to be nonconductive. In one embodiment, a conductive thermal fuse 90 may comprise two or more conductors 90a–b held together in conductive contact by an interconnection formed of a low melting point alloy 90c. Those skilled in the art will identify that conductors 90a–b as well as low melting point alloy 90c may comprise one or more surface area. Although surface areas in FIGS. 7a–b are illustrated as being more or less flat, it is identified that one or more of such surfaces may comprise increased surface areas configured as previously described herein.

It is identified that it may be desired that interconnections, for example conductors 90a–b, may be comprised of materials that minimize galvanic effects that may be caused by use of dissimilar metals. Accordingly, if terminals 91a, 92a of respective capacitors 91, 92 are aluminum, in one embodiment the conductors 90a–b are also aluminum.

It is further identified that one or more interconnection, for example conductors 90a–b, preferably maintain geometry under pressure and/or high temperature, for example, as when pressed against a terminal 91a or 92a by a compression fitting, screw, bolt, and/or the like. Under high pressure connection forces, many materials are known to flow or change their geometry. Those skilled in the art will identify that if the geometry of an interconnection changed under pressure, a resistivity at its connection points could be increased over time to an undesirable value such that heat would be generated, which in turn could increase the temperature of capacitors 91 and 92. Accordingly, in one embodiment, an interconnection may comprise a high-grade aluminum that does not flow or change its geometry easily under pressure, for example, a 4047 grade of aluminum, or other similar non-ductile metal.

Referring to FIG. 7a, in one embodiment, thermal fuse 90 is configured such that a portion of conductors 90a, 90b is fixedly connected to respective terminals 91a, 92a. In one embodiment, respective separatable end portions of conductors 90a, 90b are held in conductive contact by a low melting point alloy 90c. In one embodiment, one or both of conductors 90a, 90b are springably positioned so that they both make conductive contact. After and during making of the contact, a low melting point alloy 90c in a liquid or semi-liquid state may applied at or near the contact point of the conductors 90a, 90b such that when the low melting point alloy hardens, the conductive contact between the conductors 90a and 90b formed by the low melting point alloy 90c may be used to maintain a path for current to flow between capacitors 91 and 92.

Referring now to FIG. 7b, in one embodiment, the conductors 90a, 90b are configured such that when not held in contact by the low melting point alloy they do not make conductive contact. In one embodiment, the low melting point alloy 90c comprises a low melting point alloy of tin and bismuth. In embodiment, a low melting point alloy 90c is known by those skilled in the art as "woods metal."

In other embodiments, low melting point alloys may comprise other materials, for example, materials known as Cerro alloy, cerrolow, cerrosafe, cerroflow, cerromatrix, cerroseal, cerrobase, cerrotru, or cerrocast, cerrodent, one or more of which can comprise one or more of a Bismuth-Lead, Tin, Cadmium, Indium, and/or (Bi, Pb, Sn, Cd, In) alloy.

In one embodiment, thermal fuse 90 in a cross section may comprise a similar width and height to that of previously discussed interconnections 30. Accordingly, in one embodiment, thermal fuse 90 may exhibit $I^2R$ heating effects that that are similar to that of an interconnection 30. It is identified that these heating effects may be small as compared to the heating effects of surrounding air or heat removal medium. Thus, at certain predetermined external environmental temperature, the low temperature alloy 90c may soften sufficiently to allow the two conductors to springably separate and, thus, interrupt current flow passing between capacitors 91 and 92, as well as any other interconnected capacitors that may be connected in series. Thermal fuse 90 may be thus used to facilitate interruption in current flow independent of the current flow through the interconnection 30. Those skilled in the art will identify that above a certain temperature, even though a capacitor may not have failed, it may no longer be as reliable. Accordingly thermal fuse 90 may be used to lower the temperature of capacitors by non-reversibly interrupting current so that without some user intervention the current would not flow through the capacitors again.

In one embodiment, the alloy 90c comprises a composition that may soften enough so as to release the springable contact made by conductors 90a, 90b when a safe upper operating range of the capacitors 91, 92 has been exceeded, for example, above 85 degrees Celsius. The constituent components of the low temperature alloy 90c may be varied so as to soften or become liquid at other temperatures, and may be done so by those skilled in the art without undo experimentation. Although no container is shown in FIGS. 7a–b, in one embodiment, one or more thermal fuse 90 may be used to form an interconnection between capacitors disposed within a fluid filled container. In such an embodiment, the thermal fuse could be used to interrupt current flow based on a temperature of the fluid.

Referring now to FIGS. 8a–b, there is seen use of a thermal contactor. In one embodiment, a conductive thermal contactor 95 is interconnected across a first and second terminal of a capacitor 96. When a capacitor 96 begins to fail, or is anticipated to fail, for example as evidenced by an increased temperature of an external environment or external heat removal medium around the capacitor, thermal contactor 95 may sense the increased temperature and bypass current around the capacitor 96. It is identified that in such a case, and wherein bypassed capacitor 96 is part of a series string of interconnected capacitors, the maximum voltage that may be applied across the series string of capacitors so as not to exceed the series total of their voltage ratings would be reduced (by virtue of one or more less charged capacitor in the series string), but that one skilled in the art could overdesign such a series string of capacitors to take into account that one or more capacitor may become bypassed by a thermal contactor (for example, by adding extra capacitors to a series string in anticipation of one or more capacitor in the string failing).

Referring to FIG. 8a, in one embodiment, thermal contactor 95 may comprise at least two conductors 95a, 95b held in non-conductive separated opposition by a low melting point alloy 97. In one embodiment, the conductors 95a, 95b may comprise aluminum, copper, or other low electrically conductive material. In one embodiment, thermal contactor 95 may be configured such that at least one conductor is attached to and is compressed against a spring, for example, a spring 95c or 95d. After and during compression of at least one spring by displacement of one conductor against the spring, a low melting point alloy 97 in a softened or liquid state may be applied at or near the conductor such that when the low melting point alloy hardens, the spring remains in a compressed condition, and such the conductor remains in a static configuration opposite to another conductor. In one embodiment, the low melting point alloy 97 comprises a low melting point alloy of tin and bismuth. In one embodiment, a low melting point alloy 97 is known by those skilled in the art as "woods metal." In other embodiments, low melting point alloys may comprise other materials, for example, a materials known as Cerro alloy, cerrolow, cerrosafe, cerroflow, cerromatrix, cerroseal, cerrobase, cerrotru, or cerrocast, cerrodent, one or more of which can comprise one or more of a Bismuth-Lead, Tin, Cadmium, Indium, and/or (Bi, Pb, Sn, Cd, In) alloy.

Referring now to FIG. 8b, at some predetermined temperature, for example below 120 degrees Celsius, it is identified the low temperature alloy 97 may soften sufficiently to allow one or both springs 95c, 95d to decompress and so as to force at least one conductor 95a, 95b to move in a direction that allows a conductive contact to be made with an opposing conductor. With conductors 95a and 95b in conductive contact, instead of passing through the capacitor, current may pass around the capacitor in the direction of the arrows shown in FIG. 8b. Those skilled in the art will identify that in such a case, because no current flow would occur through capacitor 96, its temperature would be lowered. In one embodiment, the thermal contactor may be configured to be non-reversible, with such properties being desired because once a certain temperature is reached, a double-layer capacitor could be degraded in a manner that its further use would eventually cause its failure. Although no container is shown in FIGS. 8a–b, in one embodiment, one or more thermal contactor 95 may be used to form an interconnection between capacitors disposed within a fluid filled container. In such an embodiment, the thermal fuse could be used to bypass capacitor current flow based on a temperature of the fluid.

While the particular systems and methods herein shown and described in detail are fully capable of attaining the above described object of this invention, it is understood that the description and drawings presented herein represent some, but not all, embodiments of the invention and are therefore representative of the subject matter which is broadly contemplated by the present invention. For example other dimensions, other form factors, other types of capacitors and other energy storage devices could be adapted and used with one or more principles disclosed herein. Thus, the present invention should be limited by nothing other than the appended claims and their legal equivalents.

The invention claimed is:

1. A system, comprising:
one or more interconnection, the at least one interconnection comprising at least one increased surface area portion; and
at least one capacitor, the at least one capacitor electrically coupled to the one or more interconnection, wherein the one or more interconnection lowers a temperature of the at least one capacitor, a first of the one or more interconnection being coupled to a negative terminal of a first capacitor and a positive terminal of a second capacitor, a second of the one or more interconnection being coupled to a positive terminal of the first capacitor, a negative terminal of the second capacitor, and the first interconnection, the second of the one or more interconnection comprising a capacitor balancing circuit.

2. A system comprising:
one or more interconnection, the at least one or more interconnection comprising at least one increased surface area portion;
at least one capacitor, the at least one capacitor being electrically coupled to the one or more interconnection, wherein the one or more interconnection lowers a temperature of the at least one capacitor; and
a source of external heat removal that comprises a fluid, and wherein the at least one capacitor is immersed in the fluid.

3. The system of claim 2, wherein the fluid is disposed in a sealed container.

4. The system of claim 2, wherein the fluid comprises an oil.

5. The system of claim 2, wherein the fluid comprises an alcohol.

6. The system of claim 2, wherein the fluid comprises a colored fluid.

7. A method of using a plurality of capacitors, comprising the steps of:
providing a plurality of double-layer capacitors;
connecting the plurality of double-layer capacitors by one or more increased surface area interconnection;
passing a current through the plurality of double-layer capacitors; and
decreasing a temperature of the plurality of double-layer capacitors using the one or more increased surface area interconnection, the one or more increased surface area interconnection comprising a balancing circuit.

8. A method of using a plurality of capacitors, comprising the steps of:
providing a plurality of double-layer capacitors;
connecting the plurality of double-layer capacitors by one or more increased surface area interconnection;
passing a current through the plurality of double-layer capacitors;
decreasing a temperature of the plurality of double-layer capacitors using the one or more increased surface area interconnection;
passing a source of external heat removal over the plurality of double layer capacitors, the external heat removal comprising a fluid, wherein the fluid comprises an oil.

9. The method of claim 8, wherein
the plurality of double-layer capacitors being coupled to a propulsion engine.

10. A method of using a plurality of capacitors, comprising the steps of:
providing a plurality of double-layer capacitors;
connecting the plurality of double-layer capacitors by one or more increased surface area interconnection;
passing a current through the plurality of double-layer capacitors;
decreasing a temperature of the plurality of double-layer capacitors using the one or more increased surface area interconnection;
passing a source of external heat removal over the plurality of double layer capacitors, the external heat removal comprising a fluid, wherein the fluid is colored.

11. The method of claim 10, wherein the fluid is blue.

12. A method of using a plurality of capacitors, comprising the steps of:

provide a plurality of double-layer capacitors;

connecting the plurality of double-layer capacitors by one or more increased surface area interconnection;

passing a current through the plurality of double-layer capacitors;

decreasing a temperature of the plurality of double-layer capacitors using the one or more increased surface area interconnection;

passing a source of external heat removal over the plurality of double layer capacitors, the external heat removal comprising a fluid, wherein the fluid comprises a fragrance.

* * * * *